United States Patent [19]

Butler

[11] 4,389,793

[45] Jun. 28, 1983

[54] WHEEL ALIGNMENT APPARATUS

[76] Inventor: Louis L. Butler, 12489 Lockhaven Ave., Baton Rouge, La. 70815

[21] Appl. No.: 238,407

[22] Filed: Feb. 26, 1981

[51] Int. Cl.³ ............................................. G01B 5/24
[52] U.S. Cl. ................................. 33/336; 33/203.14
[58] Field of Search ................. 33/335, 336, 337, 288, 33/286, 203.12, 203.18, 203.14, 203.13, 365, 266, 228

[56] References Cited

U.S. PATENT DOCUMENTS

| | | | |
|---|---|---|---|
| 2,627,123 | 2/1953 | Taber | 33/336 |
| 2,765,540 | 10/1956 | MacMillan et al. | 33/336 |
| 3,392,454 | 7/1968 | Haley | 33/336 |
| 3,409,991 | 11/1968 | Davis et al. | 33/335 |
| 3,758,958 | 9/1973 | Jordan | 33/336 |
| 3,855,709 | 12/1974 | Hirmann | 33/203.15 |
| 4,302,104 | 11/1981 | Hunter | 356/152 |

FOREIGN PATENT DOCUMENTS 2025064  1/1980  United Kingdom ................. 33/336

*Primary Examiner*—Harry N. Haroian
*Attorney, Agent, or Firm*—Llewellyn A. Proctor

[57] ABSTRACT

An improved wheel alignment apparatus for the measurement in four-wheeled automotive vehicles, of caster, camber, toe, steering axis inclination, and track of the front and rear wheels. The apparatus, which is employed with the wheels of the vehicle setting on right and left alignment runways defining a reference plane and direction of orientation for said vehicle, includes a tire contact wheel clamp for each front wheel and a rear wheel. A tire contact wheel clamp includes a set of orthogonally related gravity sensing electrolytic transducers, and switching means are provided for selectively recording or registering an output voltage proportional to tilt angle of caster, camber, toe, steering axis inclination and track of said wheels, as well as a phase indication of tilt direction. Logic means receive the selective output voltages, and an analog-to-digital converter provides a numerical displacement output where there is tilt angle. A read-out, or numerical display of the logic means is also provided.

6 Claims, 7 Drawing Figures

WHEEL ALIGNMENT APPARATUS

CROSS REFERENCE TO RELATED PRIOR ART DISCLOSURES

The invention is an improvement and a departure over the disclosures found and identified as follows:
U.S. Pat. Nos.
- 2,177,669, Martin
- 2,603,881, Holaday
- 2,765,540, MacMillan
- 3,078,720, Hoffman, Jr.
- 3,675,495, MacMillan
- 3,865,492, Louis L. Butler
- 3,901,356, Louis L. Butler
- 3,901,604, Louis L. Butler
- 3,905,120, Louis L. Butler
- 3,906,810, Louis L. Butler
- 3,913,236, Louis L. Butler
- 4,150,897, Roberts, Jr.

None of these references and disclosures is found anticipative or suggestive of the concepts of the present invention.

BRIEF SUMMARY OF THE INVENTION

The present invention relates to an improved wheel alignment apparatus including a programmable compact sensing device to determine and measure angles of caster, camber, toe, steering axis incliniation (or king-pin inclination, K.P.I.) and track of the vehicle wheels. More particularly the invention relates to a programmed sensing device that easily attaches securely to the wheels of the vehicle in a unique fashion with correct spatial orientation to the wheel axis and using a commonly marketed and used gravity sensing variable impedance electrolytic transducer system that selectively measures angle of tilt provided in the form of an output voltage proportional to tilt angle, and also provides a phase measurement indicative of tilt direction when connected in an appropriate bridge circuit and excited with an a.c. voltage.

The following terms are redefined here as follows:
CASTER—the slight usual backward tilt of the upper end of the knuckle pin of an automotive vehicle employed as a means of giving directional stability to the front wheels.
CAMBER—a setting of the front wheels of an automotive vehicle closer together at the bottom than at the top; excessive camber prevents the tire from having correct contact with the road.
TOE—a slantingly inward of opposed mounted wheels.
K.P.I.—king-pin inclination or steering axis inclination.
TRACKING—a setting of front and rear wheels in an alignment such that the rear wheels are towed or follow in-track parallelism with the respective front wheels.

BACKGROUND OF THE INVENTION

Apparatus for use in aligning wheels of automotive vehicles are found to make measurements of four wheel alignment angles of caster, camber, K.P.I. (steering axis inclination), toe and track of the rear wheel.

Caster requires that measurements be made at a right angle to the wheel assembly and that a vertical reference be established, referencing the center assembly and that a vertical reference be established, referencing the center line of the king-pin or steering support arm to true vertical. The calculated values in degrees or fractions thereof between the two vertical planes will be the caster angle. The caster angle is commonly defined as the forward or backward tilt of the king-pin or steering support arm at the top.

Camber requires that measurement be made at a right angle to the wheel assembly and requires that a vertical reference be established, referencing the center line of the wheel assembly to true vertical. The true value in degrees or fractions thereof between the two vertical planes will be the true camber angle. The camber angle is commonly referred to as the inward or outward tilt of the wheel.

K.P.I. (king-pin or steering axis inclination) requires that measurement be made parallel to the wheel assembly and requires that a vertical reference be established referencing the center line of the king-pin or steering support assembly to true vertical, this value plus or minus the camber angle will be the calculated angle of K.P.I.

Toe requires that measurement be made to determine the parallelism, or deviation from parallel, of opposed wheels of a vehicle, either the steerable wheels, the rear wheels or both.

Tracking requires that measurement be made to determine the parallelism of all four wheels of a vehicle. The front and rear wheels of one side of the vehicle referenced to the center line of the vehicle and compared to the opposed wheels. All four wheels should track in a straight ahead position.

There are many prior art devices for measuring the angles of caster, camber and K.P.I., most devices utilize gravity seeking sensors to determine or measure departure of this reference from horizontal. Early devices used a pendulum or plum-bob with a pointer attached thereto that is referenced to a scale or chart as it departed from vertical. Martin U.S. Pat. No. 2,177,669 discloses a spirit level device for measuring camber and caster angles; MacMillan U.S. Pat. No. 2,765,540 shows an arrangement for measuring such angles with a pendulum and a variable inductive magnetic coupling arrangement; Holaday U.S. Pat. No. 2,603,881 discloses another approach which utilizes relative movement between various reference components for varying electrical resistances to determine these values; Butler U.S. Pat. No. 3,913,236 shows two gravity sensing electrolytic transducers connected in an electrical resistance bridge circuit that provides for remote readout when the selected transducer is tilted to or away from a horizontal.

Prior devices such as described above have mainly been used to measure angles of caster and camber only. Other arrangements which were designed to provide types of readout, either locally or remotely have been relatively limited, cumbersome, complex, expensive and difficult to maintain and keep in calibration.

SUMMARY AND OBJECTS OF THE INVENTION

It is a feature, object and advantage of the invention to a wheel alignment apparatus that provides
  programmable information to electronically divide the sensing capability of the sensors into known positions away from null in each direction;
  a multiple system-, time shared wires whereby multiple signals can be carried by a single pair of wires;

an integrated circuit (I.C.) for each side, i.e., left and right, and which is programmed to indicate all wheel alignment angles for a designated side of the vehicle;

a L.E.D. display system that shows instantaneous indications of the measurements and determinations as are sensed;

an on-board squaring circuit which eliminates value-change due to line voltage fluctuations and which are controlled by voltage regulators of a given voltage value;

a programmable arrangement that provides readout in degrees and fractions of degrees;

a new clamping device attached to the tire of the vehicle wheel by a unique arrangement referenced from the vehicle rim;

an index card system that is inserted in to the display panel and shows, for a particular vehicle manufacture, preferred given values of wheel alignment values and specifications for given vehicles in digital values, said values being computed and translated from inches and degrees or metric into known digital values campatible with the logic of the present invention; and modular construction of the component parts, a backlighted center cabinet which displays the illustrated angles of wheel alignment, and which can be used as an instruction and training tool or device.

It is another object of the invention to provide an improved apparatus for measuring and determing camber, caster, toe, K.P.I. and tracking of wheels on automotive vehicles and to adapt such measuring and determining so derived for digital display upon a L.E.D. of the values measured.

It is another object of this invention to provide a simple, accurate and easy-to-use means of converting automobile manufacturers wheel alignment specifications of inches and degrees to digital values such as in degrees and decimal parts of degrees and to readily display same for easy reference.

It is another object of the invention to provide apparatus of the indicated type for measuring and detecting the desired values through programmed electronic circuit means and which is simple to align and calibrate and to maintain in accurate calibration.

It is another and further object of the invention to provide apparatus of the invention to provide apparatus meeting the aforesaid objects and which is of simple, economical construction and which is easy to operate and reliable in use.

BRIEF DESCRIPTION OF THE DRAWINGS

The above and other objects and advantages of the invention will become apparent upon full consideration of the following detailed description and accompanying drawings in which.

DETAILED DESCRIPTION OF THE PREFERRED EMBODIMENT OF THE INVENTION

Figure 1:
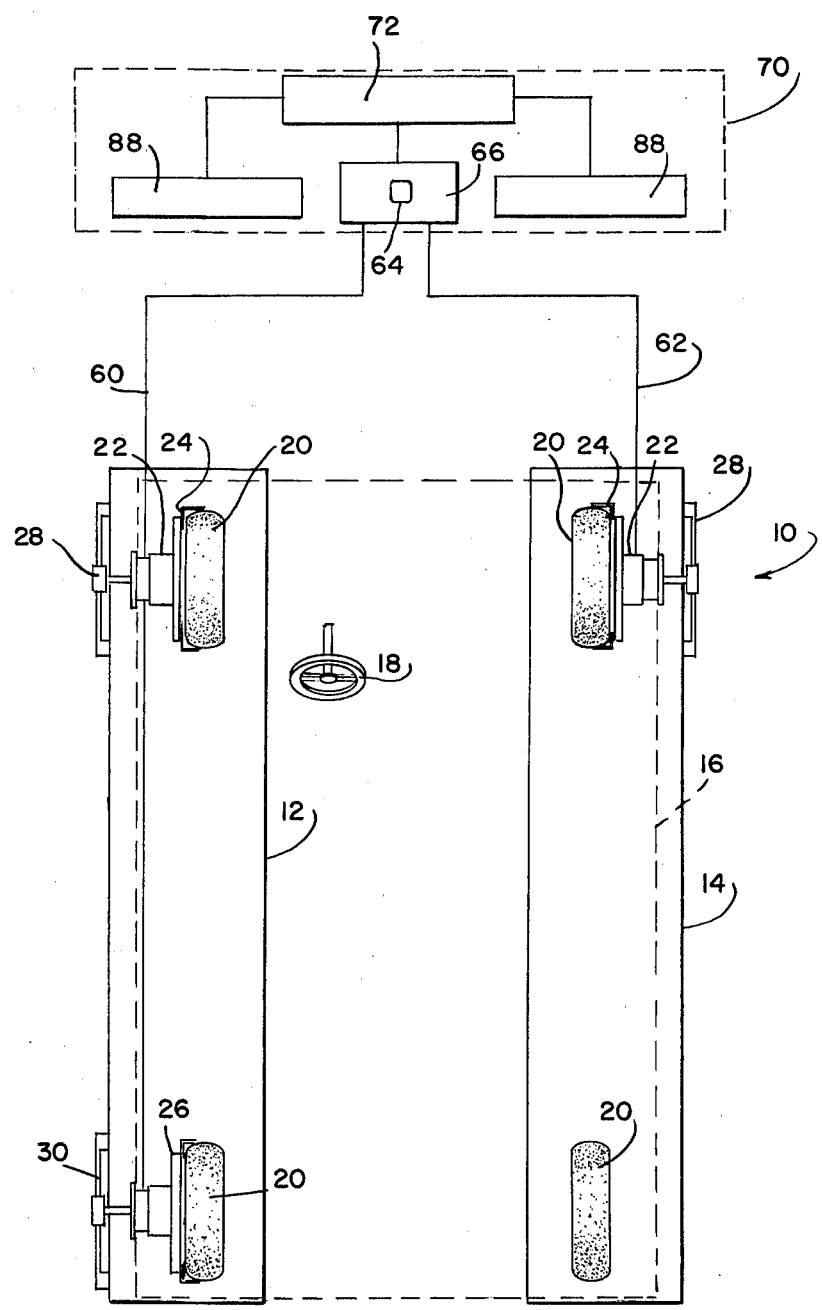
FIG. 1 is a plan, partly in schematic form, showing a wheel alignment apparatus according to a preferred embodiment of the invention.

Referring now to the drawings there is shown in FIG. 1 a wheel alignment apparatus 10, left and right alignment runways 12, 14 supporting a vehicle 16 having a conventional vehicle wheels 20, 20, 20, 20 having front left and right sensing transducer units 22, 22 being retained in position on the respective wheels 20, 20 by tire contact wheel clamps 24, 24.

Figure 2:
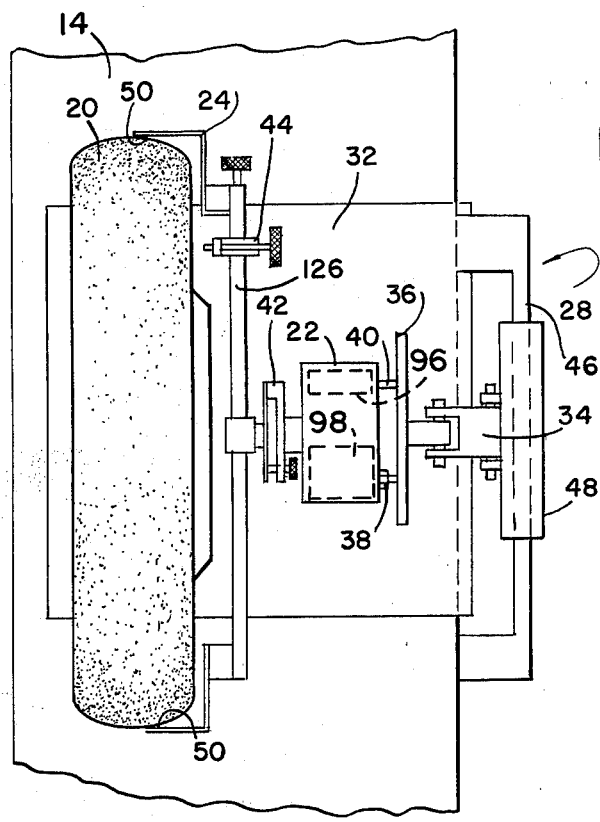
FIG. 2 shows in enlarged detail one of the wheel alignment measuring details thereof.
Figure 3:
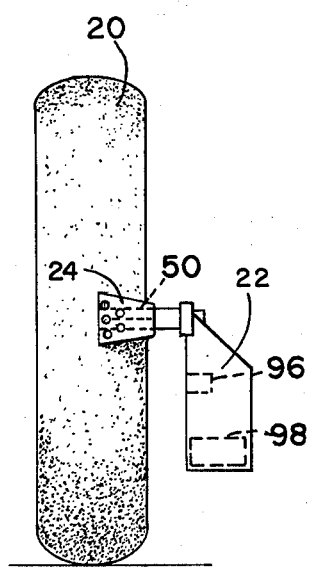
FIGS. 3 and 4 show details in front elevation and side view, respectively, of a wheel and its wheel clamp.
Figure 4:
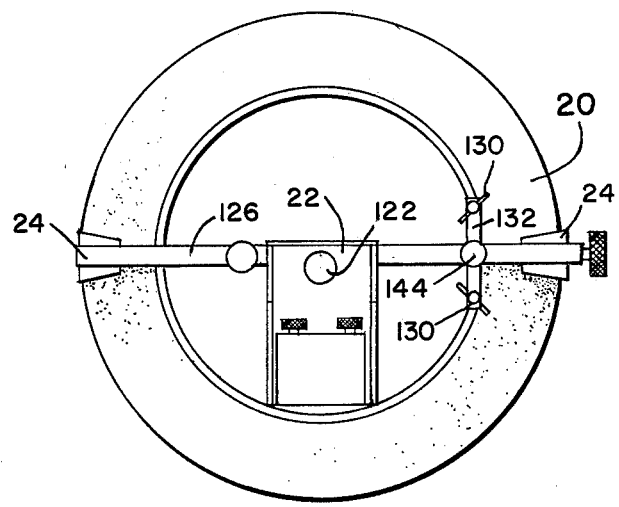

A rear left (or right) wheel sensing transducer unit 26 is mounted on rear wheel 20. Each transducer unit 22, 22, 26 are each mechanically referenced to respective front and a rear parallel flag assembly 28, 28, 30. While most alignment runway configurations are installed parallel to one another, it should be noted, however, the outboard parts of the wheel alignment apparatus have means for parallel calibration. FIG. 2 shows in detail the alignment runway 14 having wheel 20 on a turning radius and roller plate 32 for availing the front wheel to turn about its axis and as well to roll the wheel into track or runway alignment on which there is pivotally secured the parallel flag assembly 28 which is pivoted to linkage 34 which in turn is parallely linked to the parallel flag bar or plate 36 which contacts a toe calibration adjusting screw 38 mounted on the transducer unit 22 and also which contacts a toe sensor plunger or feeler 40. By adjustment of the roller plate 32 and the adjusting screw 38, the front and rear are made parallel to the runway 14. Also shown in FIG. 2 is a horizontal plane compensator 42 and a vertical plane compensator 44. The flag assembly 28 includes a round shaft 46 having a sliding member 48 engaged thereon and adjusts to a position along the shaft 46 settles along the shaft as shown when the flag plate 36 is in full parallel to the transducer unit 22 which in turn is in parallel relation to the clamp 24. The clamp 24 has on its inner end surfaces a set of line engaging projections 50 that extend into the tire wheel 20 and a tightening adjustment nut 52 is used to firmly secure the clamp on the wheel.

Cables 60, 62 extend respectively from sensing units 22, 22 to a deck switch 64 in a control panel 66 in an instrumentation console 70. The 64 selects one of several multiplexed circuits from a left or right sensor unit 22, 22 a signal indicative of castor, camber, toe, K.P.I. or track which is coupled thence to left or right logic circuit(s) 72 (FIG. 6A).

Figure 6A:
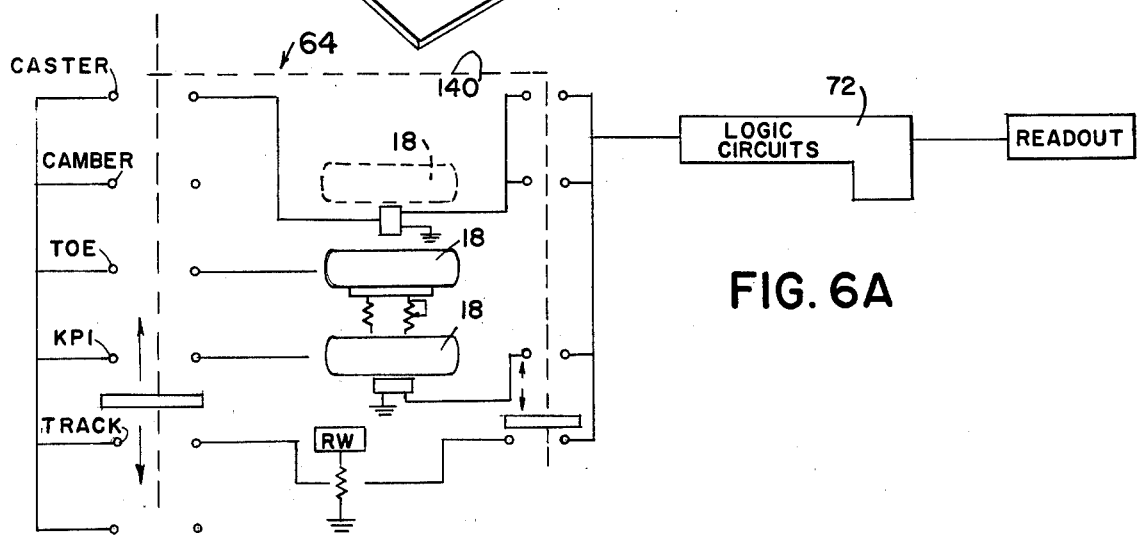
FIGS. 6A and 6B show circuit schematic diagrams of the electrical functions of the invention.
Figure 6B:
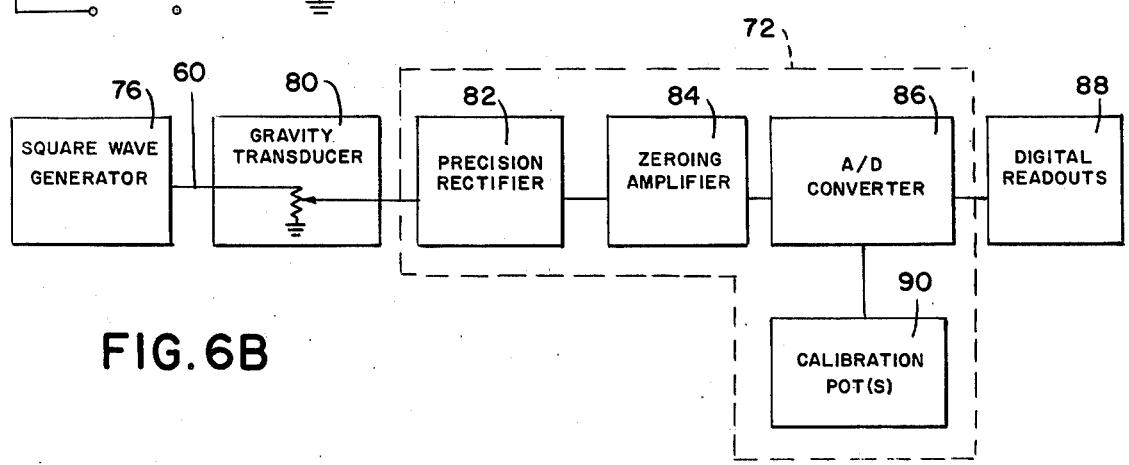

FIGS. 6A and 6B show a schematic of electrical and electronic components within the console (70 FIG. 1) which includes a square wave generator 76 that provides square wave signals over cable 60 to the sensor unit 22 having gravity sensing electrolytic transducer 80 shown in FIG. 6 and from the square wave applied thereto, there is an a.c. or square wave form output proportional to angular displacement of the transducer from a normal vertical. Such transducer known in the art is a 7660 Series, medium range electrolytic transducer or the like that produces a smooth and continuous output through a wide angle and when so connected such as in a bridge circuit, the output is directly proportional to the angle between the input axis and the horizontal. The instrument is, manufactured by The Fredericks Company, Glass Components Division, Huntingdon Valley, Pennsylvania 19006, (215) 947-2500. The unit transducer provides the stability required for openloop position indicating systems in addition to being well suited for servold applications. The gravity sensing electrolytic transducer 22 is designed to provide an output voltage proportional to tilt angle, and a phase indicative of tilt direction when connected in an appropriate bridge circuit and excited with an a.c. or alternating square wave voltage. It consists of a tubular glass envelope, partially filled with an electrolytic fluid, with metal electrodes in contact with the electrolyte, and such as have applications in a system requiring a gravity reference or a tilt indication providing a restoring or driving torque or tilt angle indication with the use of proper circuitry and readout devices, namely guidance and navigation systems, leveling and control of machine tools, platform stabilization systems and measuring systems.

The output of gravity transducer 80 is fed to a precision rectifier 82 in logic circuit 72 uses its non-linearity and cut-off of diode rectification characteristics near zero and its output is fed to zeroing amplifier 84 which performs the three functions upon its input of referencing to zero its received signal, adding a negative component and it supplies a high impedance load to the output of the precision rectifier. The output of the zeroing amplifier 84 is coupled to an analog-to-digital converter 86 that processes the signal to detect positive, negative and actual numerical displacement from a reference zero and the output is multiplexed to digital readouts 88. Connected to the A/D converter 86 there is connected an adjustable calibrated reference voltage source 90 with which to compare the output of the zeroing amplifier 84 for establishing a selected slope as may be desired.

The transducer units 22, 22, 26 may each contains or includes two gravity transducers 80 described above, each proportional electronically to known values in each direction away from null (true vertical) with one gravity transducer mounted at right angles to the wheel and the other mounted parallel to the wheel. When the sensing unit 22 is placed in a true vertical position, the set of two transducers are mechanically adjusted to null in their respective planes. Since the transducers are proportioned electronically to known values, this is usually the only calibration needed.

The gravity transducer that is mounted at right angles to the wheel senses the values of caster and camber while the one mounted parallel to the wheel senses the value of K.P.I. or steering axis inclination. The logic circuit 72 provide for readily changing the angular value of the caster-camber transducer as in determining the caster angle and its signal output is processed for providing remote L.E.D. readout of the measured values on readouts 88. Thus the two gravity transducers comprise a set of orthogonally oriented gravity sensing transducers; equivocally it can be shown that a two axis gravity transducer may be constructed which permits measurement of tilt angle in two axis simultaneously and when connected with proper circuitry will provide a restoring or measuring torque or indication for two axis operation.

The sensing unit also includes a potentiometer 96 mounted in the sensing transducer unit 22. The potentiometer 96 is actuated by means of a plunger or toe senser feeler 40 (FIG. 2) that moves the pot wiper thereof from a known position. Like the two orthogonally related gravity transducers described above, the potentiometer 96 is proportioned electronically to known values from a center position of the wiper in each direction. Movement of the plunger in either direction, in or out, will change the value which is displayed on the L.E.D. display readout 88, and will indicate the true value of toe. This requires that the flag plate 36, a straight edge, is disposed in parallel relation to and in alignment with the runways, as shown, and when the toe flag plates make contact with the sensing transducer units 22 they will cause the potentiometer 96 and plunger or feeler 40 to be displaced which will indicate the departure of the wheels from parallel thus indicative true value of toe.

Cabling 60, 62 is connectable to unit 22 and control panel 66 by cord and phone plug of conventional construction.

In the unit 22 includes a further track potentiometer 98 in the rear wheel unit 26. The tracking device includes track potentiometer 98 actuated by a "T" bar configuration that moves a pot wiper when displaced from a known or given position, and like the other sensor elements, the potentiometer is proportioned electronically to a known value from the center position of the wiper in each direction. The "T" bar is positioned parallel to the alignment runways 12, 14 and the potentiometer is mechanically and electrically calibrated to zero. When the "T" bar is placed parallel to and against the rear wheel of a vehicle, the movement of the pot wiper in either direction will change the value which will indicate the track of the rear wheel as referenced to being parallel to the alignment runway. A known position of the rear wheel as in setting toe, described above, is significant or important when centering the steering wheel 18 and setting the front wheels in a straight ahead position. Similarly values of track determined as described may be displayed by the L.E.D. readouts 88, 88.

By switching the deck switch 64 in the control panel 66, for example, in the 'caster' position the angular caster values of the front wheels 20, 20 may be displayed on the readouts 88, 88. Then placing the deck switch 64 in the 'camber' position the angular camber values of the front wheels may be computed and selectively displayed on readouts 88, 88. Further switching the deck switch to 'K.P.I.', 'toe' and 'track', the electrical values thereof are displayed on the readouts.

In summary of track measurements described above, rear wheel sensing unit 26 when mechanically compared and referenced to rear flag assembly 30 will indicate digitally on left readout 88 a numerical difference in parallel, if any, between the rear wheel 20 and the flag assembly 30. This measurement is important in determining the track of the rear wheels and more especially to the centerline of the steering wheel 18. Front wheel sensing units 22 when referenced to the front flag assembly 28 are seen to indicate on the readout 88 the null or difference measurement between the front wheels 20, 20.

Figure 5:
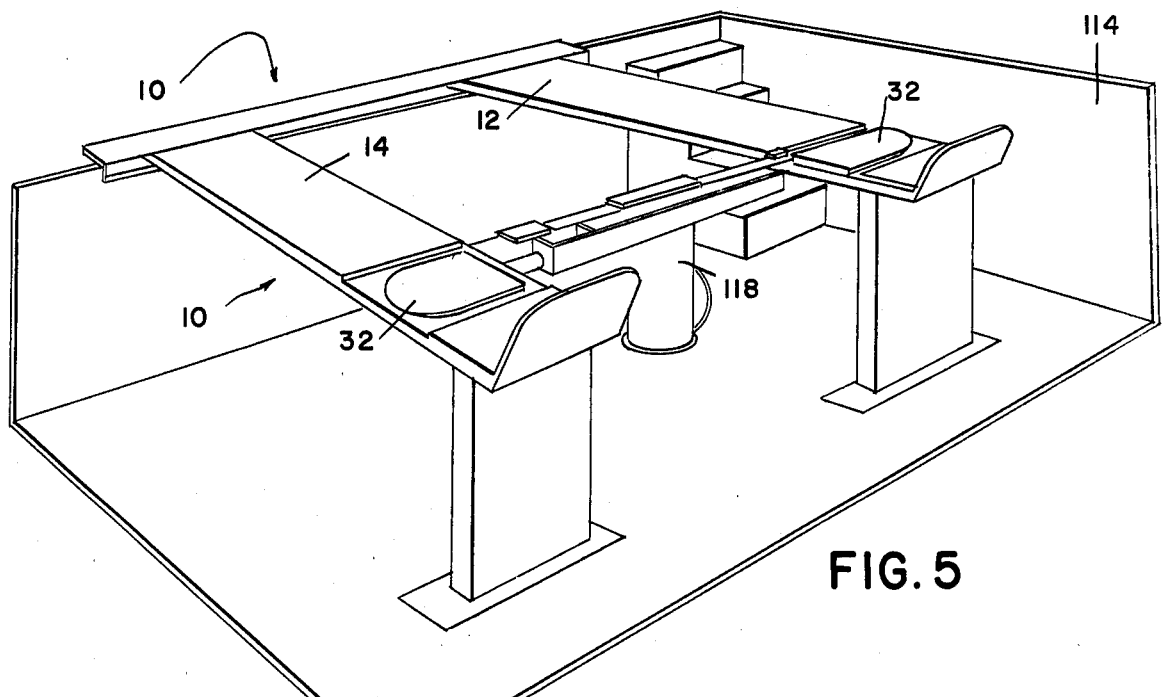
FIG. 5 shows a perspective view of turning radius and roller plates for each of the front wheels mounted on an alignment rack according to use of the system of the present invention.

There is shown in the perspective view of FIG. 5 a pit alignment rack 110 for use with passenger cars and medium sized heavy duty trucks and having wheel alignment apparatus 10 described in FIGS. 1 to 4 with left and right alignment runways 12, 14 for a vehicle (not shown). The pit alignment rack 110 is mounted in a pit 114 and the pit may have a depth of 30 inches up to 48 inches for allowing more working room under the vehicle. Traveling air jack mechanism 118 provides means to lift the vehicle in a conventional manner.

The turning radius and roller plates 32,32 comprise each a stacked series of plates including, listing in series from the bottom to the top, a base plate, a movable race plate with roller bearings therein, a pivot plate, a pivotal race plate with ball bearing disposed therein and turning radius and roller plate 32.

The turning plates may have a turning radius scale securably mounted ahead of a wheel rest position proximate the pivot of the plates mentioned above and the turning radius scale measures or indicates angle left and right in degrees measured from 0° of straight ahead. Also the measurement of the angle left and right may be indicated on the instrumentation console 70.

For purposes of providing two dimensional adjustments the sensing transducer units 22, 22 (FIG. 4) may be provided with a compensation spindle 122 on the wheel bar 126 disposed between the wheel bar clamps 24, 24 and precise two dimensional adjustments are provided by positioning and tightening wing nuts 130 on an adjustable rim reference and vertical plane compensator 44, 132. FIG. 6A shows a deck switch 64.

Additional embodiments of the invention in this specification will occur to others and therefore it is intended that the scope of the invention be limited only by the appended claims and not by the embodiments described hereinabove. Accordingly, reference should be made to the following claims in determining the full scope of the claims.

What is claimed and desired to be secured by Letters Patent is:

1. In an improved wheel alignment apparatus for the measurement in four-wheeled, tired, automotive vehicles of caster, camber, toe, steering axis inclination, and track of the front and rear wheels, while the tired wheels of said vehicle are setting upon parallel aligned runways, a right and left runway, defining a reference plane and direction of orientation for said vehicle, the combination which comprises
   a tire contact wheel clamp inclusive of an elongate wheel bar at each terminal end of which is located a laterally projecting wheel bar clamp for operative contact of the inner face thereof with the alternately disposed outer edges of a tire, one for horizontally mounting on the outer side of each right and left front wheel, and at least one other for horizontally mounting on the outer side of a rear wheel,
   orthogonally related gravity sensing electronic transducers mounted on the elongate wheel bar of each tire contact wheel clamp, one mounted at a right angle to the elongate wheel bar, and another mounted parallel to the elongate wheel bar,
   a flag assembly, one for each tire contact wheel clamp, inclusive of a sliding member slidably mounted on a shaft parallel with a runway connected via linkage to a flag bar mounted parallel to said shaft for contact with a toe sensor plunger and toe calibration adjustment screw located in circuit with the gravity sensing electronic transducers,
   electrical cables connected to and extending from each orthogonally related gravity sensing electronic transducer providing multiplexed electrical circuits,
   a deck switch associated with each of said multiplexed electrical circuits, providing electrical means for selectively switching from one multiplexed electrical circuit to another,
   logic means electrically coupled via electrical cables to said deck switch,
   an electrical generator which provides voltage signals over the electrical cables to each of the gravity sensing electrical transducers, the electrical transducers when associated with a multiplexed electrical circuit via selective manipulation of the deck switch to transmit to the logic circuit an output voltage proportional to tilt angle of caster, camber, toe, steering axis inclination, and track of said wheels, and
   read out means for numerical interpretation and display of the signals transmitted from said gravity sensing electronic transducers to said logic means in terms of caster, camber, toe, steering axis inclination and track of said wheels.

2. The apparatus of claim 1 wherein light-emitter devices comprise said numerical display.

3. The apparatus of claim 1 wherein said tire contact wheel clamp has means engaging contact with a rim edge of said wheel.

4. The apparatus of claim 1 wherein said transducer provide said output proportional to the tilt angle between an input axis and a horizontal.

5. The apparatus of claim 1 wherein said transducer provides an a.c. output in response to a regulated square wave generator is applied to the transducer, and said a.c. output is coupled to an amplifier augmenting its nonlinearity and cut-off of diode rectification characteristics near zero, an output of said amplifier is coupled to a zeroing amplifier for adding a negative component and for furnishing high impedance load characteristic to the amplifier, which produces an output fed to said analog-to-digital converter.

6. The apparatus of claim 5 wherein calibration means is connected to said analog-to-digital converter to provide selected data input.

* * * * *